US012092084B2

(12) United States Patent
Mannik et al.

(10) Patent No.: US 12,092,084 B2
(45) Date of Patent: Sep. 17, 2024

(54) LOCKING MECHANISM FOR A WIND TURBINE GENERATOR

(71) Applicant: Vestas Wind Systems A/S, Aarhus N. (DK)

(72) Inventors: Henrik Zaar Mannik, Hammel (DK); Mustafa Gündüz, Lübeck (DE); Ulrich Meinekat, Eutin (DE); Peter Mongeau, Center Conway, NH (US); Marcin Janota, Cieszyn (PL)

(73) Assignee: Vestas Wind Systems A/S, Aarhus N (DK)

( * ) Notice: Subject to any disclaimer, the term of this patent is extended or adjusted under 35 U.S.C. 154(b) by 155 days.

(21) Appl. No.: 17/420,728

(22) PCT Filed: Jan. 9, 2020

(86) PCT No.: PCT/DK2020/050006
§ 371 (c)(1),
(2) Date: Jul. 6, 2021

(87) PCT Pub. No.: WO2020/143889
PCT Pub. Date: Jul. 16, 2020

(65) Prior Publication Data
US 2022/0065229 A1 Mar. 3, 2022

Related U.S. Application Data

(60) Provisional application No. 62/790,565, filed on Jan. 10, 2019.

(30) Foreign Application Priority Data

Jan. 30, 2019 (DK) .......................... PA 2019 70068

(51) Int. Cl.
*F03D 80/00* (2016.01)
*H02K 7/18* (2006.01)

(52) U.S. Cl.
CPC ............ *F03D 80/00* (2016.05); *H02K 7/1838* (2013.01); *F05B 2260/31* (2020.08); *H02K 2213/06* (2013.01)

(58) Field of Classification Search
CPC .......................... H02K 7/1838; F05B 2260/31
See application file for complete search history.

(56) References Cited

U.S. PATENT DOCUMENTS 9,476,396 B2 * 10/2016 Fritzsche ............ F02N 11/0866
2003/0102677 A1 * 6/2003 Becker .................... F03D 15/00
290/55

(Continued)

FOREIGN PATENT DOCUMENTS

| CN | 203039518 U | 7/2013 |
| CN | 107528429 A | 12/2017 |

(Continued)

OTHER PUBLICATIONS

Danish Patent and Trademark Office, Search and Examination Report in PA 2019 70068, dated Jul. 24, 2019.

(Continued)

*Primary Examiner* — Tulsidas C Patel
*Assistant Examiner* — Thomas K Quigley
(74) *Attorney, Agent, or Firm* — Wood Herron & Evans LLP

(57) ABSTRACT

A generator (24) for a wind turbine (1) comprises a rotor (32) with an axis of rotation, a stator and a radial and/or axial locking mechanism. The radial locking mechanism comprises a plurality of radial locks (60) with a fixed portion (70) coupled to the stator and a movable elongate portion (72) configured to move relative to the fixed portion (70) and radially with respect to the axis of the rotation to lock the stator in a radial direction. The rotor (32) may comprise at least one lock engagement feature (86) arranged at its end (Continued)

surface and an end shield (90) located axially outward and at least partially adjacent the end surface. The end shield (90) comprises at least one opening enabling access to the end surface of the rotor (32). The axial locking mechanism may comprise at least one axial lock (80) comprising a removable block (82) configured to partly cover the at least one opening of the end shield (90) and a rotor engagement tool (84) for engaging the removable block (82) with the at least one lock engagement feature (86).

27 Claims, 9 Drawing Sheets

(56) References Cited

U.S. PATENT DOCUMENTS

| | | | |
|---|---|---|---|
| 2010/0275442 A1 | 11/2010 | Ohl, Jr. | |
| 2011/0135481 A1* | 6/2011 | Koronkiewicz | F03D 80/00 29/889 |
| 2011/0298330 A1 | 12/2011 | Joeckel | |
| 2012/0070304 A1* | 3/2012 | Nielsen | F03D 80/50 416/244 R |
| 2014/0322018 A1* | 10/2014 | Fritzsche | H02J 1/08 416/169 R |
| 2014/0377062 A1 | 12/2014 | Jakobsen et al. | |
| 2017/0288501 A1 | 10/2017 | Eriksen et al. | |
| 2020/0088163 A1* | 3/2020 | Giengiel | F03D 13/10 |

FOREIGN PATENT DOCUMENTS

| | | |
|---|---|---|
| EP | 2148090 A1 | 1/2010 |
| EP | 2607684 A1 | 6/2013 |
| EP | 2690284 A1 | 1/2014 |
| KR | 20140072561 A | 6/2014 |
| WO | 2010103086 A2 | 9/2010 |
| WO | 2018108506 A1 | 6/2018 |

OTHER PUBLICATIONS

European Patent Office, International Search Report and Written Opinion in PCT Application No. PCT/DK2020/050006, dated Apr. 14, 2020.
China National Intellectual Property Administration, office action issued in corresponding Chinese application No. 202080018203.7, dated Apr. 29, 2023, with English translation.
Japanese Patent Office, office action issued in corresponding JP Application No. 2021-540261, dated Jul. 24, 2023, with English translation.
Intellectual Property India, The Patent Office, examination report issued in corresponding IN Application No. 202117035657 dated Nov. 29, 2022.
Intellectual Property India, The Patent Office, hearing notice issued in corresponding IN Application No. 202117035657 dated Mar. 19, 2024.

* cited by examiner

LOCKING MECHANISM FOR A WIND TURBINE GENERATOR

FIELD OF THE INVENTION

The present invention relates to a generator for a wind turbine and to a rotor assembly for a generator for a wind turbine. Specifically, the present invention relates to a locking mechanism used in a generator and a rotor assembly disposed in a wind turbine.

BACKGROUND OF THE INVENTION

Wind turbines convert kinetic energy from the wind into electrical energy, using a large rotor with a number of rotor blades. A typical Horizontal Axis Wind Turbine (HAWT) comprises a tower, a nacelle on top of the tower, a rotor hub mounted to the nacelle and a plurality of wind turbine rotor blades coupled to the rotor hub. Depending on the direction of the wind, the nacelle and rotor blades are turned and directed into an optimal direction by a yaw system for rotating the nacelle and a pitch system for rotating the blades.

The nacelle houses many functional components of the wind turbine, including for example a generator, gearbox, drive train and rotor brake assembly, as well as convertor equipment for converting the mechanical energy at the rotor into electrical energy for provision to the grid.

The gearbox steps up the rotational speed of the low speed main shaft and drives a gearbox output shaft. The gearbox output shaft in turn drives the generator, which converts the rotation of the gearbox output shaft into electricity. The electricity generated by the generator may then be converted as required before being supplied to an appropriate consumer, for example an electrical grid distribution system. So-called "direct drive" wind turbines that do not use gearboxes are also known. In a direct drive wind turbine, the generator is directly driven by a shaft connected to the rotor Wind turbines are typically intended to be used for long periods of times, with the operational lifetime of a wind turbine often spanning tens of years. As a result, it is expected that components of the wind turbine will need to be maintenanced or replaced during its operational lifetime as these components undergo degradation through use. This is particularly true of the electrical and magnetic components of the generator and the mechanical components of the generator.

The nacelle of a wind turbine will often be positioned around 100 metres from the ground, and so to perform any sort of maintenance on any of the elements housed in the nacelle (such as the generator or the gearbox) can require a great deal of time, effort and expertise. Furthermore, whilst the wind turbine is undergoing maintenance, it will be required to be non-operational and such maintenance time therefore introduces a source of inefficiency to the operation of the wind turbine.

Typically, when such maintenance of internal components of the generator or the gearbox is required, it is necessary to disassemble the whole, or at least a substantial part, of the generator and/or the gearbox in order to access the internal component which is to be repaired or replaced. However, the rate of degradation of each of the internal components of the generator and the gearbox will usually vary and as a result, it is expected that not all of the internal components will require maintenance at the same time. Therefore, full or substantial disassembly means enabling access to internal components which do not require maintenance. This can lead to accidental damage of otherwise serviceable components.

Furthermore, full or substantial disassembly of the generator and/or the gearbox necessarily takes a great deal of time and as a result leads to a long period of time where the wind turbine is non-operational. This can be particularly inefficient, especially in cases where the actual maintenance or replacement of an internal component of the generator or the gearbox is relatively quick to perform.

Therefore, there are circumstances where it is beneficial to be able to disassemble parts of the generator and/or the gearbox whilst maintaining the overall structure of the generator and/or the gearbox. This may be the case as above where the disassembled parts need to undergo maintenance or replacement, but the remaining parts may be left in place.

Additionally, the generator and the gearbox will occasionally need to undergo transport after they have been fully assembled. This may be the case when the wind turbine is first brought into operation and the fully assembled generator and gearbox need to be lifted to the top of the tower. The generator and the gearbox contain a number of internal components as identified above that may be damaged during such transport. Therefore, there is a need to provide a system in which the risk of damage to these internal components during transport is minimised. One such way of ensuring this would be to fully or substantially disassemble the generator and the gearbox and transport each of the elements separately. However as discussed above, such disassembly can be time consuming and inefficient. Therefore, there is a need to provide a system in which the risk of damage to elements of the nacelle can be minimised without requiring that the generator and the gearbox be fully disassembled.

It is an object of the present invention to overcome one or more of the problems described above.

SUMMARY OF THE INVENTION

According to a first aspect of the invention, a generator for a wind turbine is provided. The generator comprises a rotor assembly, a stator and a radial locking mechanism, the rotor assembly comprises a rotor with an axis of rotation and an end surface located on an axial end of the rotor, and the rotor comprises at least one lock engagement feature arranged at the end surface. The rotor assembly further comprises an end shield located axially outward and at least partially adjacent the end surface, the end shield comprising at least one opening enabling access to the end surface of the rotor. The rotor assembly additionally comprises an axial locking mechanism comprising at least one axial lock comprising a removable block configured to partly cover the at least one opening of the end shield (90) and a rotor engagement tool for engaging the removable block with the at least one lock engagement feature. The axial locking mechanism is arranged to shift the rotor assembly between an axially locked and an axially unlocked configuration. In the axially locked configuration the removable block of the at least one axial lock is placed against the end shield, thereby at least partly covering the at least one opening, while the rotor engagement tool engages the removable block with the at least one lock engagement feature, such that the axial lock resists axial movement of the rotor. In the axially unlocked configuration, the removable block and the rotor engagement tool are removed from the opening of the end shield such that the rotor is movable in at least one axial direction. The radial locking mechanism comprises a plurality of radial locks. The radial locks comprise a fixed portion coupled to the stator and a movable elongate portion configured to move relative to the fixed portion and radially with respect to the axis of the rotation. The radial locks are arranged to shift the generator between a radially locked and a radially unlocked configuration. In the radially locked configuration, the movable elongate portions of the radial locks contact an exterior surface of the rotor and are coupled to their respective fixed portions such that the movable elongate portions resist radial movement of the rotor. In the radially unlocked configuration, the movable elongate portion of at least one of the radial locks does not contact the exterior surface of the rotor such that the rotor is movable in at least one radial direction.

With the radial locks engaged, radial movements of the rotor relative to the stator and other static parts of the generator are blocked. Engagement of the radial locks is conveniently realised by just moving the elongate portions towards the exterior surface of the rotor. With the radial locks engaged, the rotor is protected against damage during transport of the generator. Further, radially locking the rotor may allow for maintenance operations during which, e.g., parts of the rotor or the bearing cassette supporting the gearbox output shaft are serviced or temporarily removed. With the axial locks engaged, axial movements of the rotor relative to the stator and other static parts of the generator are blocked. Engagement of the axial locks is conveniently realised by just placing the removable block against the end shield and engaging the engagement tool of the lock with the engagement feature at the end surface of the rotor. With the axial locks engaged, the rotor is protected against damage during transport of the generator. Further, axially locking the rotor may allow for maintenance operations during which, e.g., parts of the rotor or the bearing cassette supporting the gearbox output shaft are temporarily removed.

In an embodiment of this aspect of the invention, the generator is configured to shift between a locked and an unlocked configuration. In the locked configuration, the generator is in the radially locked configuration and the radially unlocked configuration. In the unlocked configuration, the generator is in the radially unlocked configuration and/or in the axially unlocked configuration.

According to a further aspect of the invention, an alternative generator for a wind turbine is provided. The generator comprises a rotor with an axis of rotation, a stator and a radial locking mechanism, wherein the radial locking mechanism comprises a plurality of radial locks. The radial lock comprises a fixed portion coupled to the stator and a movable elongate portion configured to move relative to the fixed portion and radially with respect to the axis of the rotation. The radial lock is arranged to shift the generator between a radially locked and a radially unlocked configuration. In the radially locked configuration, the movable elongate portions of the radial locks contact an exterior surface of the rotor and are coupled to their respective fixed portions such that the movable elongate portions resist radial movement of the rotor. In the radially unlocked configuration, the movable elongate portion of at least one of the radial locks does not contact the exterior surface of the rotor such that the rotor is movable in at least one radial direction.

With the radial locks engaged, radial movements of the rotor relative to the stator and other static parts of the generator are blocked. Engagement of the radial locks is conveniently realised by just moving the elongate portions towards the exterior surface of the rotor. With the radial locks engaged, the rotor is protected against damage during transport of the generator. Further, radially locking the rotor may allow for maintenance operations during which, e.g., parts of the rotor or the bearing cassette supporting the gearbox output shaft are temporarily removed.

Preferably, the plurality of radial locks are positioned such that at least when the generator is in the radially locked configuration, the movable elongate portions of the radial locks extend between two adjacent windings of the stator. In such a configuration, the elongate portions can be made accessible from an exterior of the generator, which allows for easy engagement and disengagement of the radial locks, even when the rotor is fully surrounded by the stator. In order to prevent damage to the stator and to avoid blockage of the locking mechanism by the stator windings (e.g. due to thermal expansion or wear), it is preferred that the movable elongate portions of the radial locks extend between two adjacent windings of the stator without contacting either of the two adjacent windings of the stator.

In an embodiment, the plurality of radial locks are arranged in opposite pairs, and the radial locks of one of the opposite pairs are located in substantially equal axial positions and substantially diametrically opposite one another with respect to the axis of the rotation of the rotor. With just two of such pairs, movement in all radial directions may be prevented.

For easy installation, and to avoid interference with the stator core, at least one of the plurality of radial locks may be located at a drive end of the rotor and at least one of the plurality of radial locks may be located at the non-drive end of the rotor, the non-drive end facing away from the wind turbine powertrain when in use. When providing radial locks at both ends, radial movement of the rotor and also tilting of the rotor is prevented even better.

When the housing of the generator is substantially cuboid shaped, the plurality of radial locks may be arranged such that access to the radial locks is enabled via at least one face of the housing extending along the axial direction for shifting the respective radial lock between the radially locked and the radially unlocked configuration. For example, the housing may be provided with a plurality of lock access cavities, the lock access cavities being positioned to enable access to the elongate portions of the respective radial locks from outside the housing.

In a preferred embodiment, the plurality of radial locks are arranged in pairs of adjacent radial locks in substantially equal axial positions and both adjacent radial locks in the pair of adjacent radial locks are accessible from the same face of the housing. Also, multiple pairs of adjacent radial locks may be arranged such that they are accessible from the same face of the cuboid housing.

According to a yet further aspect of the invention, an alternative generator of a wind turbine is provided, comprising a rotor assembly. The rotor assembly comprises a rotor, an end shield and an axial locking mechanism. The rotor has an axis of rotation and an end surface located on an axial end of the rotor. The rotor further comprises at least one lock engagement feature arranged at the end surface. The end shield is located axially outward and at least partially adjacent the end surface and comprises at least one opening enabling access to the end surface of the rotor. The axial locking mechanism comprises at least one axial lock comprising a removable block configured to partly cover the at least one opening of the end shield and a rotor engagement tool for engaging the removable block with the at least one lock engagement feature. The axial locking mechanism is arranged to shift the rotor assembly between an axially locked and an axially unlocked configuration. In the axially locked configuration the removable block of the at least one axial lock is placed against the end shield, thereby at least partly covering the at least one opening, while the rotor engagement tool engages the removable block with the at least one lock engagement feature, such that the axial lock resists axial movement of the rotor. In the axially unlocked configuration, the removable block and the rotor engagement tool are removed from the opening of the end shield such that the rotor is movable in at least one axial direction.

In the context of this invention, the term 'rotor assembly' is used for the combination of the generator rotor and one or more axial locking mechanisms. Since locking the rotor is to be done relative to some static reference frame, also an end shield is considered to be part of the rotor assembly. It is noted that, in a fully assembled generator, the end shield may either be a part of the generator housing itself or a separate static part comprised therein and fixedly attached thereto.

With the axial locks engaged, axial movements of the rotor relative to the stator and other static parts of the generator are blocked. Engagement of the axial locks is conveniently realised by just placing the removable block against the end shield and engaging the engagement tool of the lock with the engagement feature at the end surface of the rotor. With the axial locks engaged, the rotor is protected against damage during transport of the generator. Further, axially locking the rotor may allow for maintenance operations during which, e.g., parts of the rotor or the bearing cassette supporting the gearbox output shaft are temporarily removed.

Preferably, the opening enabling access to the rotor is located at the non-drive end of the rotor assembly, the non-drive end facing away from the wind turbine powertrain when in use. Since the generator is the last unit of the wind turbine powertrain, the openings will be easily accessible from the non-drive end, which makes engagement of the axial locks an easy task.

Preferably, the rotor comprises a plurality of the lock engagement features. Furthermore, the end shield may comprise a plurality of the openings enabling access to the end surface of the rotor. Having multiple lock engagement features and/or rotor housing openings, increases the chance that the lock engagement features are accessible through the openings, regardless of the rotational position of the rotor. When a distance between every two adjacent lock engagement features is smaller than the width of the opening or openings in the end shield, there will always be at least one accessible lock engagement feature at each opening.

When the lock engagement features and the openings are located radially outward from one or more internal components of the rotor assembly, some internal components of the rotor are accessible and removable from an exterior of the rotor assembly when the rotor assembly is in its axially locked configuration. Similarly, a bearing cassette in a gearbox and other centrally located parts such as a stray current module may be accessible and removable from an exterior of the rotor assembly when the rotor assembly is in its axially locked configuration. A central opening in the end shield allows the serviced parts to be reached or removed.

In an embodiment, the end shield comprises four openings and the centres of two consecutive openings are separated angularly with respect to the axis of the rotation by an angle of 90°.

The at least one lock engagement feature may comprise a threaded tie rod end and where, in the axially locked configuration, the rotor engagement tool of the axial lock is screw fitted to the tie rod end. The tie rod may be part of the core structure of the rotor. In such a configuration, the axial lock can engage directly with the core structure of the rotor and will provide for a strong and stable connection, thereby ensuring that the rotor cannot be moved axially when in the axially locked configuration.

In some embodiments, the axial lock may further comprise a push pin configured to move relative to the end shield and axially with respect to the axis of the rotation of the rotor. In the axially locked configuration of the rotor assembly, the push pin is configured to contact the end surface of the rotor and is coupled to the axial lock such as to further resist axial movement of the rotor in the direction of the end shield.

By providing both a push pin and a rotor engagement tool full axial locking of the rotor in both vector axial directions is ensured. In these embodiments, the rotor engagement tool engages with the lock engagement feature of the rotor and effectively "pulls" the rotor toward the end shield, and resists the axial movement of the rotor away from the end shield. Simultaneously, the push pin is brought into contact with the end surface of the rotor and effectively "pushes" the rotor axially away from the end shield, and resists axial movement of the rotor toward the end shield. The combination of the two axial resistances described above effectively locks the rotor in a single axial position.

It is to be appreciated that features included in embodiments of various aspects described above may be combined with embodiments of other aspects where appropriate.

According to a further aspect of the invention, a wind turbine is provided comprising a generator as described in above aspects and embodiments.

According to a further aspect of the invention, a method is provided for removing or servicing one or more powertrain components from a powertrain of a wind turbine, the powertrain comprising a generator as described above. The method comprises engaging the radial locking mechanism, engaging the axial locking mechanism and removing or servicing the one or more powertrain components through a central opening in the end shield.

In some embodiments, the one or more powertrain components comprises one or more internal components of the rotor assembly.

In an embodiment, the one or more powertrain components comprises a bearing cassette of a gearbox, which in use, is operatively coupled to the rotor assembly.

In further embodiments, the one or more powertrain components comprises a stray current protection module.

BRIEF DESCRIPTION OF THE DRAWINGS

In order that the invention may be more readily understood, reference will now be made, by way of example, to the accompanying drawings in which.

DETAILED DESCRIPTION

A specific embodiment of the present invention will now be described in which numerous features will be discussed in detail in order to provide a thorough understanding of the inventive concept as defined in the claims. However, it will be apparent to the skilled person that the invention may be put into effect without the specific details and that in some instances, well known methods, techniques and structures have not been described in detail in order not to obscure the invention unnecessarily.

Figure 1:
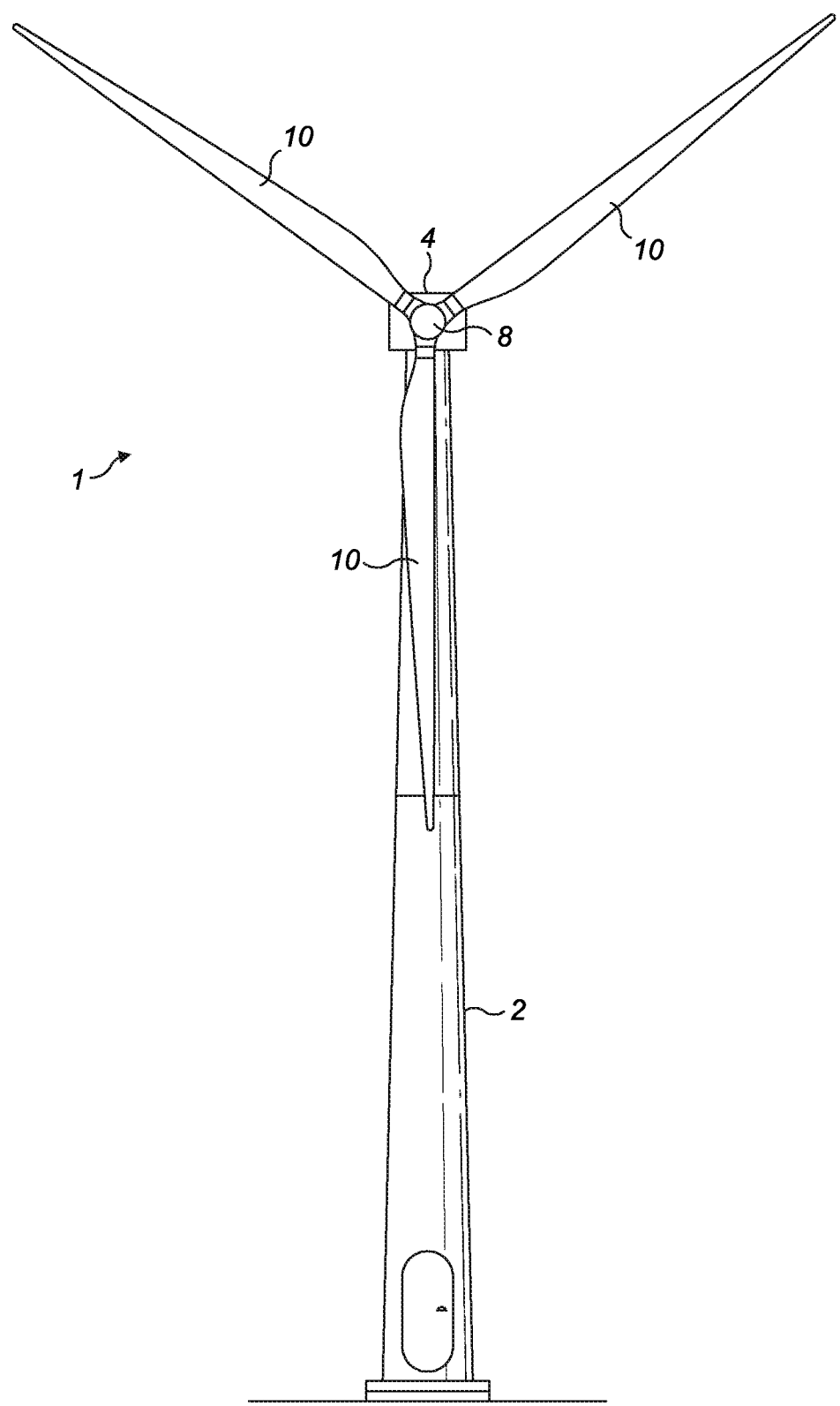
FIG. 1 is a front view of a Horizontal Axis Wind Turbine.

In order to place the embodiments of the invention in a suitable context, reference will firstly be made to FIG. 1, which illustrates a typical Horizontal Axis Wind Turbine (HAWT) in which a locking mechanism according to an embodiment of the invention may be implemented. Although this particular image depicts an on-shore wind turbine, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 1 comprises a tower 2, a nacelle 4 rotatably coupled to the top of the tower 2 by a yaw system, a rotor hub 8 mounted to the nacelle 4 and a plurality of wind turbine rotor blades 10 coupled to the rotor hub 8. The nacelle 4 and rotor blades 10 are turned and directed into the wind direction by the yaw system.

Figure 2:
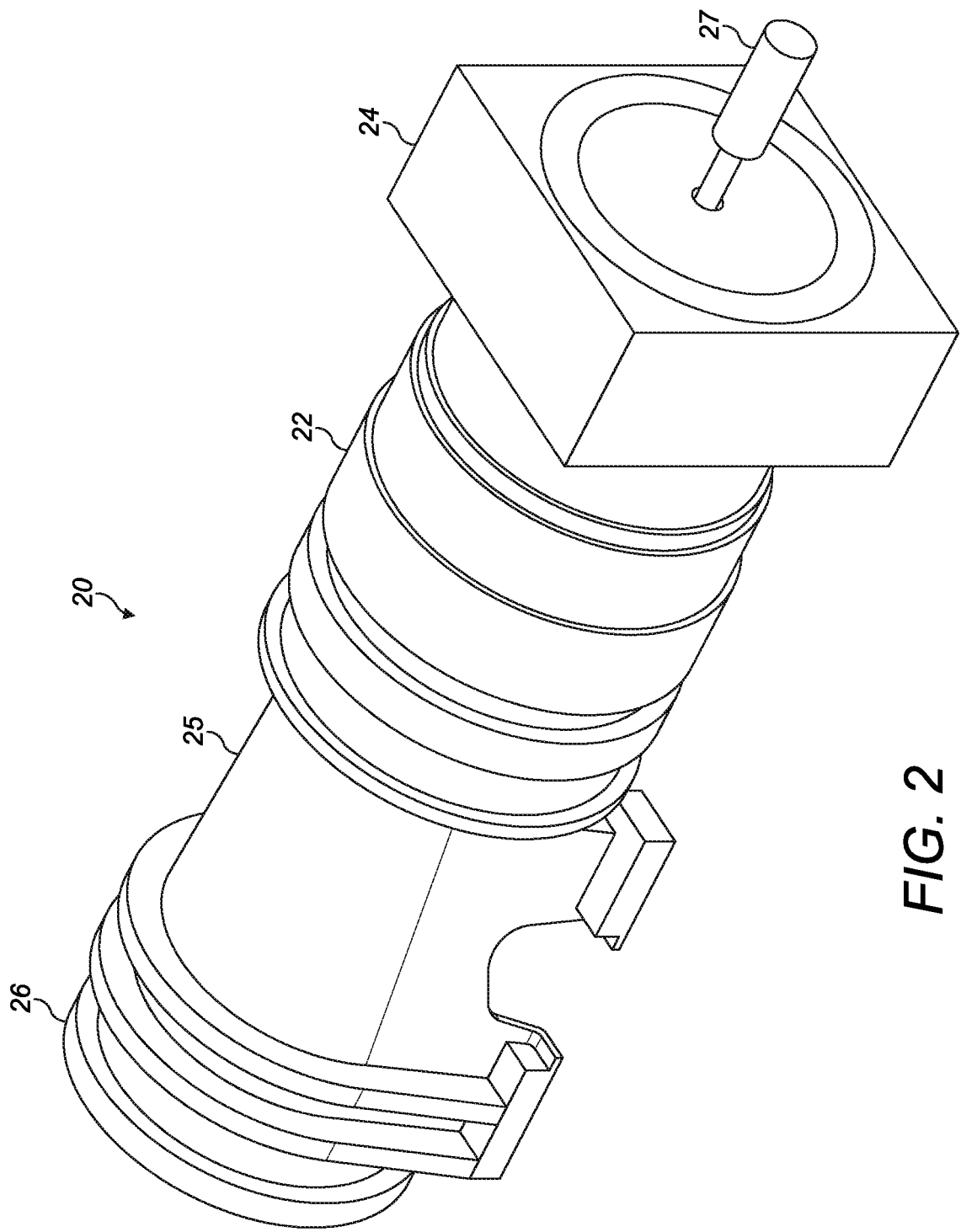
FIG. 2 is a schematic and perspective view of the main functional components housed within a nacelle of a typical Horizontal Axis Wind Turbine.
Figure 3:
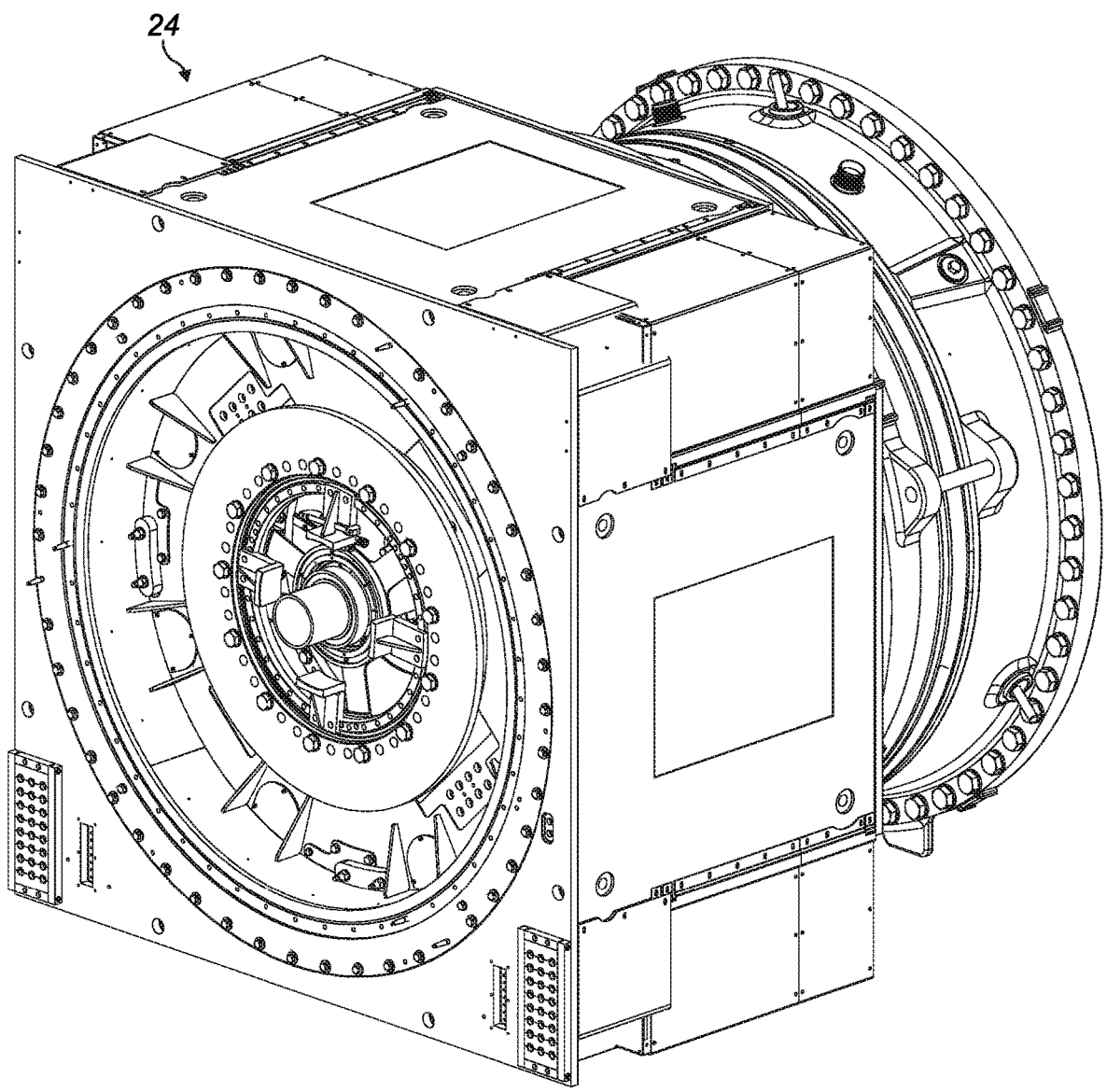
FIG. 3 is an isometric view of the generator of the nacelle of FIG. 2, coupled to a gearbox.

With reference to FIG. 2, the nacelle 4 may include an electrical power generating assembly 20, which includes a gearbox 22 and a generator 24. A main shaft 26, is supported by a main bearing housing 25 and is connected to, and driven by, the rotor hub 8 and provides input drive to the gearbox 22. The gearbox 22 steps up the rotational speed of the low speed main shaft 26 via internal gears (not shown) and drives a gearbox output shaft (not shown). The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system. So-called "direct drive" wind turbines that do not use gearboxes are also known. In a direct drive wind turbine, the generator 24 is directly driven by a shaft connected to the rotor. A so called 'pitch tube' 27 may be arranged to pass along the centre of the generator 24 and the gearbox 22 to provide hydraulic and/or electric services to the rotor hub 8. The gearbox 22 and generator 24 may be coupled together in an integrated unit. FIG. 3 shows the generator 24 in more detail. In FIG. 3, also the housing of the last stage of the gearbox 22 is shown as it is coupled to the housing of the generator 24.

With reference firstly to the gearbox 22, a gearbox housing is generally cylindrical in form and is oriented such that its major rotational axis is substantially horizontal. The cylindrical configuration of the gearbox housing is due to the specific type of gearbox that is used in the illustrated embodiment, which is an epicyclic gearbox. As the skilled person would know, an epicyclic gearbox comprises a series of planet gears that are arranged about a central sun gear, and which collectively are arranged within an encircling ring gear. The ratio of the number of teeth between the ring gear, the planet gear and the sun gears determines the gear ratio of the gearbox. For clarity, fine detail of the gearbox will not be described in further detail here as the gearbox is not the principal subject of the invention. Suffice to say that other gearbox configuration could also be used, although it is currently envisaged that an epicyclic gearbox is preferred.

Figure 4:
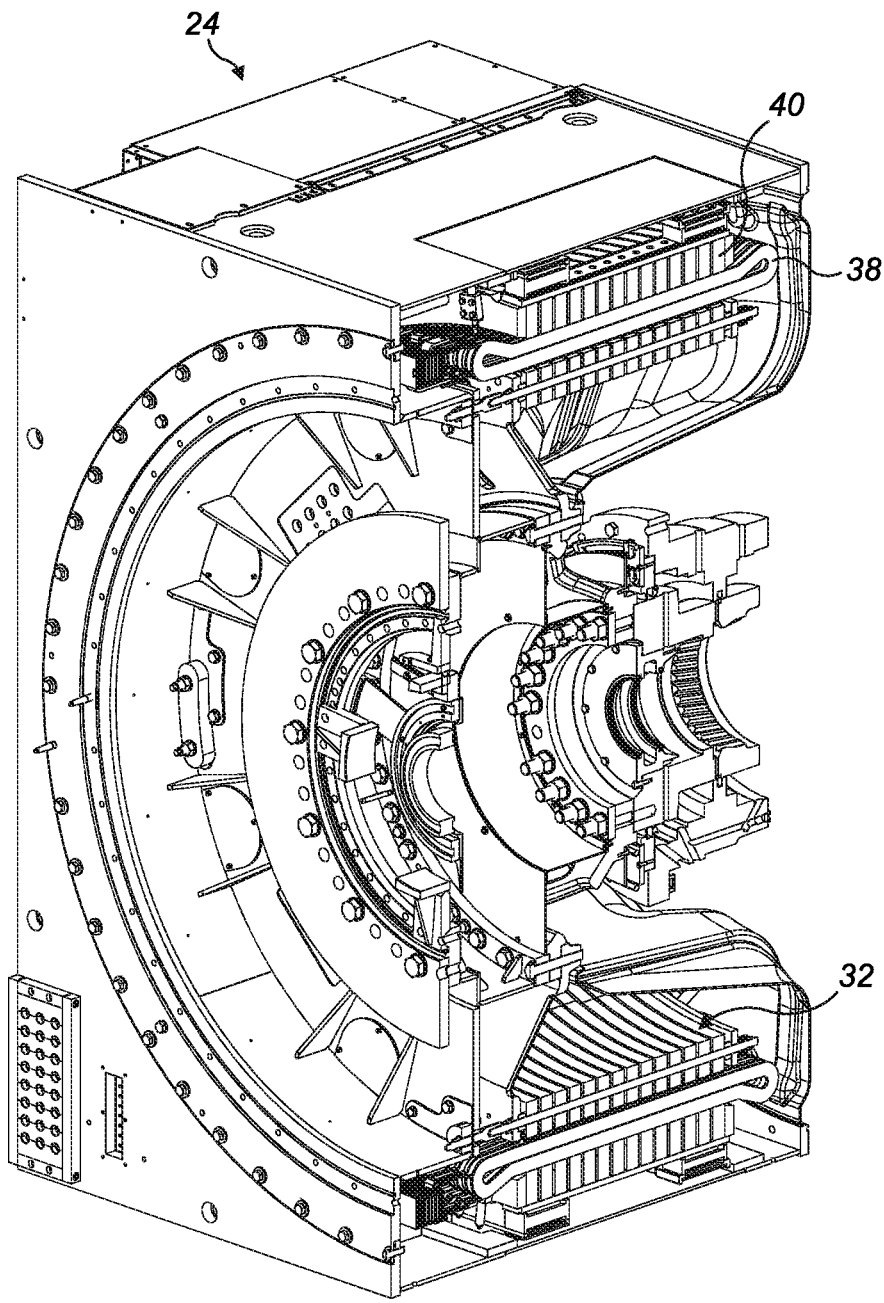
FIG. 4 is a cutaway view of the generator of FIG. 3.

The output shaft of the gearbox 22 interfaces with a rotor 32 of the generator 24. As such, the major axis of the gearbox output shaft defines the rotational axis of the generator 24. In FIG. 4, a cutaway view on the generator 24 only is provided. The generator 24 in the illustrated embodiment is an IPM (interior permanent magnet) electric machine having an external stator, which surrounds the rotor 32. The stator includes stator windings 38, a stator core 40 and a stator frame which surrounds and supports the stator windings 38 and stator core 40. It is however noted that the invention is not limited to a specific type of rotor or stator.

In an embodiment of the present invention, there are provided radial and axial locking mechanisms which may each be configured to be included as part of a generator 24. The radial and axial locking mechanisms are provided in order to enable the generator 24 to shift between radially locked and radially unlocked configurations, and axially locked and axially unlocked configurations, respectively. In the radially locked configuration, radial movement of the rotor 32 with respect to the axis of rotation of the generator 24 is resisted, and in the radially unlocked configuration, the rotor 32 is movable in at least one radial direction. Similarly, in the axially locked configuration, axial movement of the rotor 32 with respect to the axis of rotation of the generator 24 is resisted, and in the axially unlocked configuration, the rotor 32 is movable in at least one axial direction. An exemplary embodiment of radial and axial locking mechanisms disposed in use are described in greater detail below with reference to FIGS. 5 to 8.

In some embodiments, the generator 24 is also configured to shift between an overall locked and unlocked configuration. In the locked configuration, the generator 24 is arranged to be both in the radially and axially locked configurations. In the unlocked configuration, the generator 24 is arranged such that it is in the radially and/or axially unlocked configuration.

It is beneficial for the generator 24 to have both locked and unlocked configurations (radially, axially or a combination of the two). When in use, the rotor 32 may undergo movement in both axial and radial directions. Restricting such movement whilst in use may mean that the generator 24 does not perform at maximum efficiency, as rotation of the rotor 32 may also be restricted as a result, leading to less electricity being generated. However, there are also scenarios where the restriction of movement in axial and radial directions is beneficial. Once such circumstance is where the generator 24 and/or the nacelle 4 as a whole is being transported between locations. In these cases, any radial or axial movement of the rotor 32 may cause damage to components of the generator 24, such as the rotor 32 itself, or the external stator. It is therefore of use to be able to restrict the axial and radial movements of the rotor 32 in these circumstances. Being able to switch between locked and unlocked configurations enables the prevention of damage to the generator 24 during transport whilst also not restricting the rotation of the rotor 32 when the generator 24 is in use.

Furthermore, in some embodiments of the present invention, the radial and/or axial locks may be positioned within the generator 24 such that when the generator 24 is in a locked configuration (radially, axially or a combination of the two), it is possible to access components of the generator 24. These accessible components can then be removed or otherwise maintenanced whilst still maintaining the overall structure of the generator 24. The generator 24 therefore does not need to be substantially disassembled in order to service these components. A central opening in the end shield allows the serviced parts to be reached or removed. Examples of components which may be removed in these embodiments include a stray current protection module, a washer disc and a rotor extension. Furthermore, the radial and/or axial locks may be positioned within the generator 24 such that when the generator 24 is in a locked configuration (radially, axially or a combination of the two), it is possible to access components of the gearbox through the locked generator 24. Such components may include the bearing cassette, temperature and vibration sensors which are part of the gearbox. In this manner, it is possible to remove and/or service elements of the gearbox without having to first remove the generator 24.

Referring now to FIGS. 5 to 8, there are shown views of part of the generator 24 in an embodiment of the generator 24 which is provided with radial and axial locking mechanisms.

Figure 5:
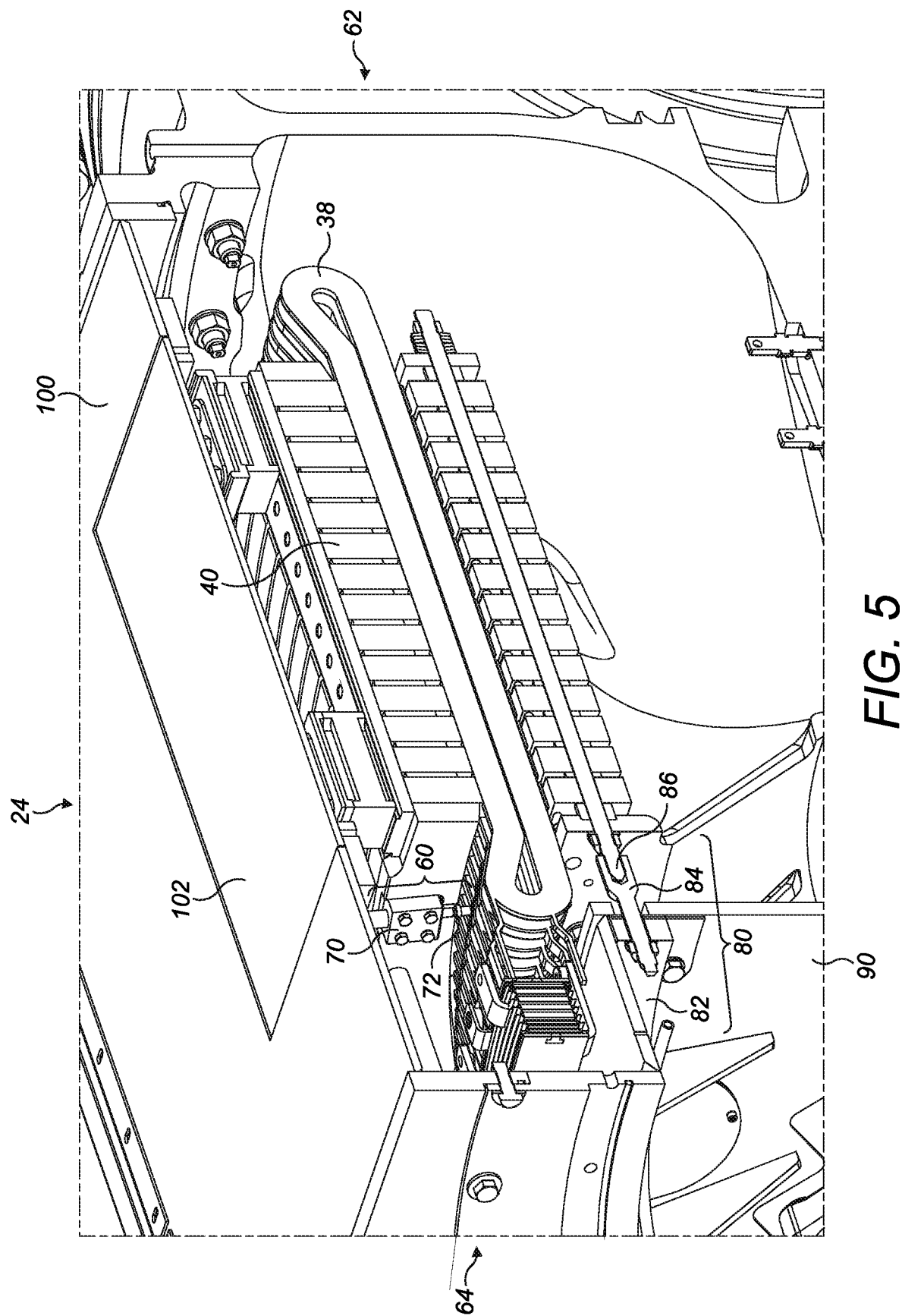
FIG. 5 is a cutaway isometric view of the generator of FIG. 2 in an axially locked and radially unlocked configuration.
Figure 6:
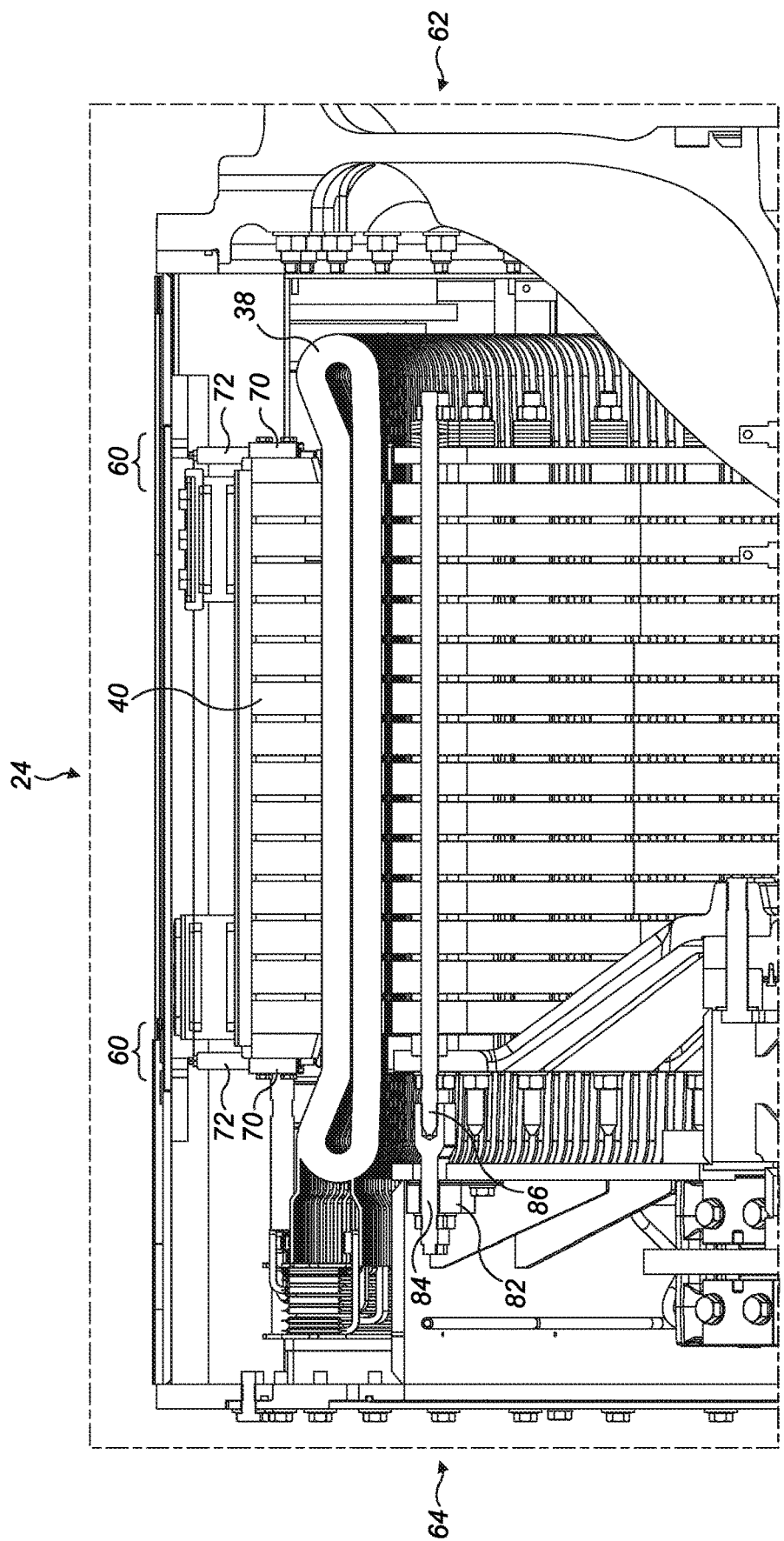
FIG. 6 is a side view of the generator of FIG. 2 in an axially locked and radially unlocked configuration.
Figure 7:
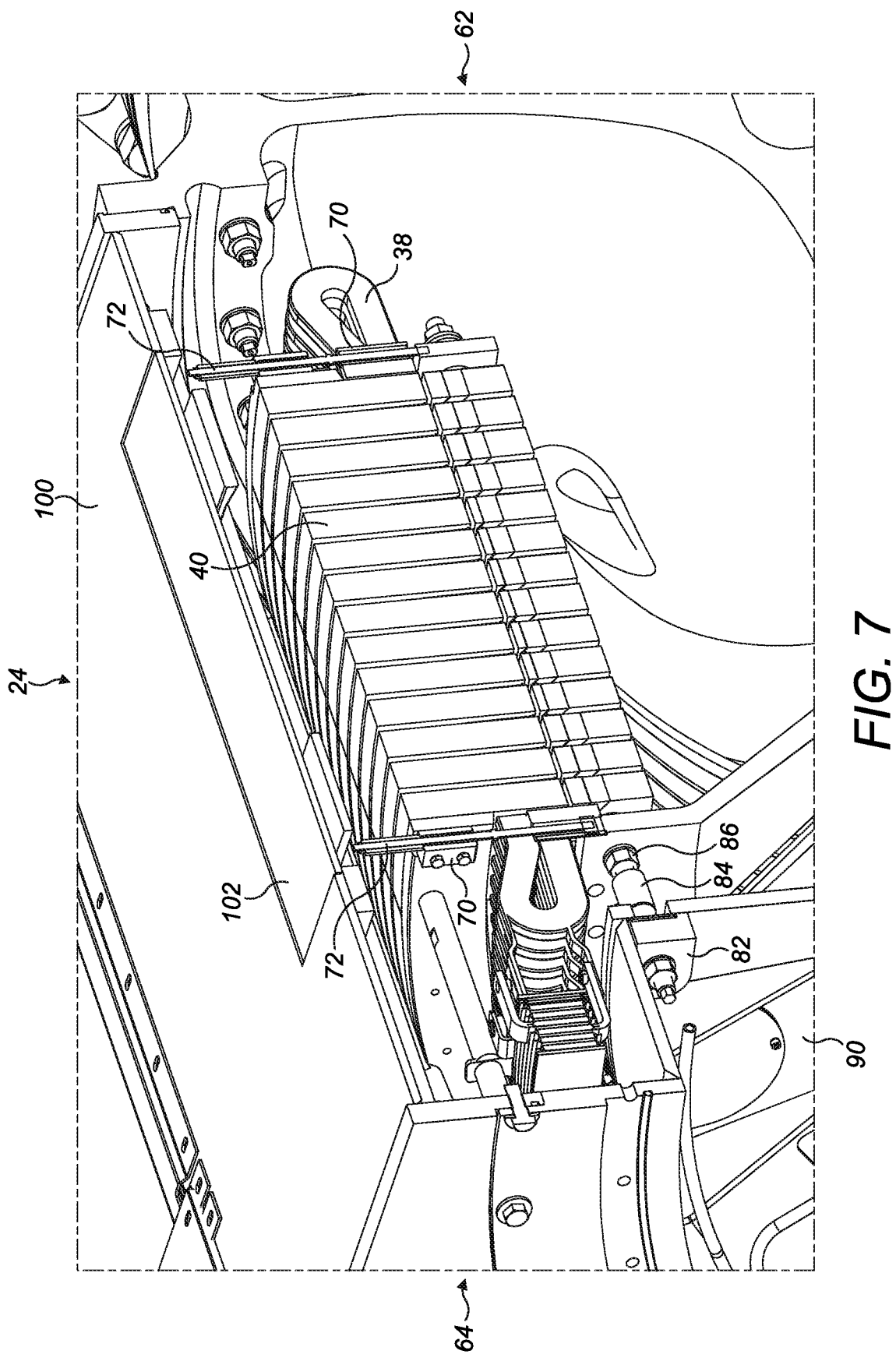
FIG. 7 is a cutaway isometric view of the generator of FIG. 2 in an axially and radially locked configuration.
Figure 8:
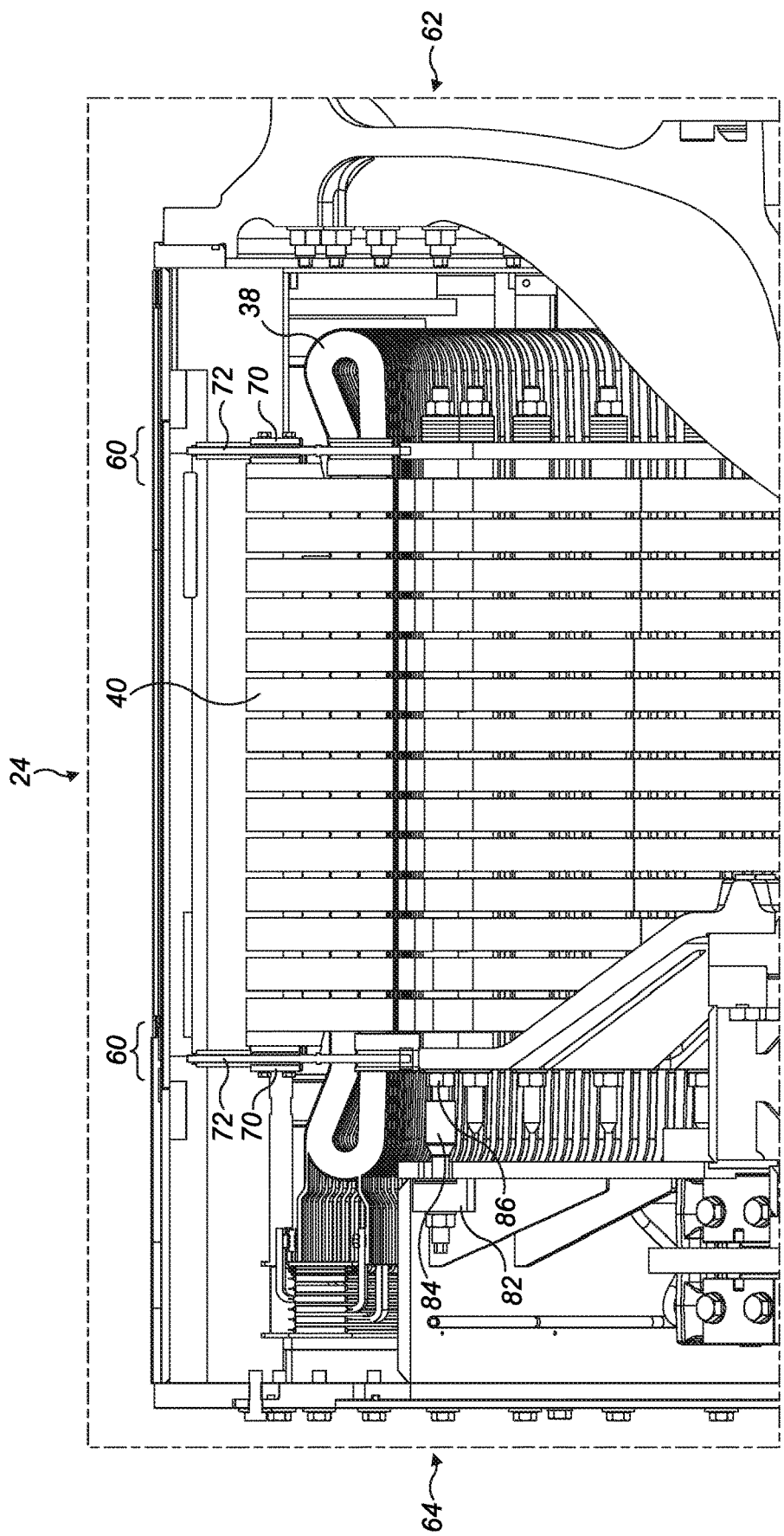
FIG. 8 is a side view of the generator of FIG. 2 in an axially and radially locked configuration.

FIGS. 5 and 6 show the generator 24 in a radially unlocked and axially locked configuration. FIGS. 7 and 8 show the generator 24 in a radially locked and axially locked configuration.

The radial locking mechanism shown in FIGS. 5 to 8 comprises a plurality of radial locks 60 disposed at various positions around the generator 24. In FIG. 5, only one radial lock 60 is shown and in FIGS. 6 to 8, two radial locks 60 are shown. In FIGS. 6 to 8, one radial lock 60 is disposed at a drive end 62 of the rotor 32 and one radial lock 60 is disposed at the non-drive end 64 of the rotor 32. The non-drive end 64 of the generator 24 is defined as being the end which faces away from the wind turbine drive train (powertrain) when in use and the drive end 62 of the generator 24 is defined as being the end which faces the wind turbine drive train.

In FIGS. 6 to 8, the two radial locks 60 are located at two different axial locations but with the same angular position with respect to the axis of rotation of the rotor 32. It is to be appreciated that in some embodiments of the present invention, there may be provided a plurality of radial locks 60 positioned at different angular positions with respect to the axis of rotation, with each of the radial locks 60 being positioned at one of the two different axial locations. The inclusion of radial locks 60 at a plurality of different angular positions enables radial movement of the rotor 32 to be restricted in a greater number of radial directions. It is to be appreciated that whilst the axial positioning of the radial locks 60 is shown as being at a drive end 62 and a non-drive end 64 of the rotor 32, other axial positions may be used in an embodiment which uses the same or similar forms of radial lock 60.

Each radial lock 60 illustrated in FIGS. 5 to 8 comprises a fixed portion 70 and a movable elongate portion 72. In these Figures, the fixed portion 70 comprises a plate or block bolted to an end of the stator frame. The block is provided with a cavity through which the movable elongate portion 72 is disposed and is configured to move through. The movable elongate portion 72 comprises a push pin which is configured to move relative to the plate or block. The push pin also moves radially with respect to the axis of rotation of the generator 24. In some embodiments, the elongate portion 72 comprises a bolt which is configured to be threaded through the fixed portion 70

In this embodiment, in order for the generator to be placed into a radially locked configuration, each of the push pins of the radial locks 60 is configured to be moved through the block of their respective radial lock 60 into a position where it is in contact with an exterior surface of the rotor 32. Once each of the push pins is brought into contact with the exterior surface, they are each additionally coupled to the block of their respective radial lock such that each push pin resists radial movement of the rotor 32 in a particular radial direction. This coupling may be achieved by the block comprising a spring loaded mechanism configured such that when the pushing pin is brought into contact with the exterior surface of the rotor 32, the pushing pin is pushed through the spring mechanism and locked into position with respect to the block. This spring loaded mechanism may then be released when the generator 24 is to be shifted to a radially unlocked configuration. In other embodiments, the pushing pin may comprise a threaded bolt and the block may be threaded in a complementary manner. The threaded bolt may be screwed through the block in order to bring it into contact with the exterior surface of the rotor 32. This may be achieved using a screwdriver, a torque wrench or any other suitable hand held tool. The threading then acts so as to couple the threaded bolt to the block and resists movement of the rotor 32 in a particular radial direction. In yet further embodiments, the pushing pin may comprise a hole through its diameter, and when it is brought into contact with the exterior surface of the rotor 32, a key is configured to be inserted through the hole and the fixed portion 70, holding the push pin in place with respect to the fixed portion 70.

The plurality of radial locks 60 are positioned angularly and axially with respect to the axis of rotation such that when the radial locking mechanism is in the radially locked configuration, the movement of the rotor is resisted in all radial directions. Such an embodiment preferably comprises at least three radial locks 60 positioned at a drive end 62 of the rotor 32 and at least three radial locks 60 positioned at a non-drive end 64 of the rotor 32, with each of the three radial locks 60 at each end of the generator 24 separated by an angle of 120 degrees with respect to the axis of rotation. In alternate embodiments, there may be provided further radial locks 60 at each end of the generator 24 wherein the angular separation between each of the radial locks 60 is less than 120 degrees. In such embodiments, the angular separation between each consecutive radial lock 60 may not be equal.

FIGS. 7 and 8 show a radially unlocked configuration of the generator 24 where the pushing pins are not in contact with an exterior surface of the rotor 32 and where the rotor 32 is movable in at least one radial direction. FIGS. 7 and 8 show a configuration of the generator 24 where the pushing pins of the illustrated radial locks 60 are brought into contact with an exterior surface of the rotor 32 and are coupled to the blocks of their respective radial locks 60. It is to be appreciated that FIGS. 7 and 8 only illustrate part of the generator 24 and therefore only two radial locks 60 are shown, which may only enable radial movement to be resisted in respect of some radial directions. In a complete illustration showing the full generator 24, it is envisaged that further radial locks 60 would be shown which enable resistance to movement of the rotor 32 in all radial directions.

In operation, the radial locking mechanism of the present invention is configured to be able to shift from a radially unlocked configuration as shown in FIGS. 7 and 8 to a radially locked configuration as shown in FIGS. 7 and 8, and vice versa when each configuration is required. Typically, the radial locking mechanism will be shifted to a radially locked configuration when access is required to inner components of the rotor 32. Such access may be needed when inner components of the rotor 32 require maintenance, and radially locking the rotor 32 enables a user to more readily access these components such that they can be removed or otherwise repaired without having to remove the complete rotor. For an installed wind turbine, the generator 24 is shifted between the unlocked configuration and the locked configuration when the rotor 32 has been slowed down to be stationary. Additionally, the radial locking mechanism will also be shifted to the radially locked configuration when the generator 24 and/or gearbox are to be transported from one location to the other. Radially locking the rotor during transportation can prevent damage to components of the generator 24 and/or gearbox which may otherwise be incurred if the rotor was allowed to move freely in a radial direction. In embodiments where a plurality of radial locks 60 are provided at a plurality of different angular positions, the provision of the plurality of radial locks 60 in such an arrangement enables the generator 24 and/or gearbox to be transported in a plurality of positions whilst minimising the risk of damage caused to the generator 24 and/or gearbox due to radial movement of the rotor.

In this embodiment, the radial locking mechanism is configured to be shifted between the radially unlocked and radially locked configurations regardless of the rotational position of the rotor. Consequently, this means that when a shift between the unlocked configuration and locked configuration is required, the rotor 32 may simply be stopped in any rotational position and does not need to be specially aligned to the positions of the radial locks 60.

Typically, the stator comprises multiple windings 38 which are used in conjunction with the rotation of the rotor 32 in order to generate electrical energy. In some embodiments of the present invention, at least of some of the radial locks 60 of the radial locking mechanism are positioned such that when the generator 24 is in the radially locked configuration the movable elongate portions 72 of the radial locks that are employed will extend between two adjacent windings 38 of the stator. Such an embodiment can be seen clearly in the cutaway illustration of FIG. 7 which shows the movable elongate portion 72 extending toward and contacting the rotor 32 in front of one such stator winding 38. There will then be a further stator winding 38 (not visible in the cutaway illustration) which is positioned in front of the movable elongate portion 72 such that the movable elongate portion 72 extends between the two adjacent stator windings. In some embodiments, the radial locks 60 may be positioned such that there is no contact between the movable elongate portions 72 of the radial locks 60 and the stator windings when the generator 24 is in the radially locked configuration. In some embodiments not shown of the present invention, the plurality of radial locks 60 can be arranged in opposite pairs. In such embodiments, each radial lock 60 of the opposite pair of radial locks are arranged such that they are located in a substantially equal axial position along the generator 24 but diametrically opposite to one another with respect to the rotor 32. In these embodiments, the positioning of each radial lock 60 of the opposite pair acts so as to prevent radial movement of the rotor 32 in opposite vector directions to one another. There may be a plurality of opposite pairs of radial locks 60 provided in the generator 24, with each opposite pair preventing radial movement of the rotor 32 in different vector directions to other opposite pairs.

The generator 24 may be provided with a housing 100 which is substantially cuboid shaped. This is partially visible in FIGS. 5 and 7, but is more clearly visible in FIGS. 3 and 4. Where such a housing 100 is provided, the radial locks 60 may be positioned within the generator 24 such that access to each of the radial locks 60 is enabled via at least one face of the housing 100. In particular, the radial locks may be arranged such that access is enabled via at least one of the faces which extends along the axial direction of the generator 24. Access to the radial locks 60 via a face of the housing 100 allows a user to move the movable elongate portions 72 of each of the radial locks 60 such that the generator 24 may be shifted between the radially locked and radially unlocked configurations in accordance with embodiments described above.

In further embodiments, the plurality of radial locks 60 may also be arranged in adjacent pairs, with each radial lock 60 of the adjacent pair being positioned in substantially equal axial positions and such that both of the radial locks 60 in the adjacent pair are accessible from the same face of the housing 100 in accordance with embodiments described above. It is to be appreciated that the plurality of radial locks 60 may be arranged simultaneously both in adjacent pairs as described here, and opposite pairs as described in embodiments above. Further, in embodiments where there is a plurality of adjacent pairs of radial locks 60, two adjacent pairs of radial locks 60 may further be arranged such that each radial lock 60 of the two adjacent pairs as described above are accessible from the same face of the housing 100. Such an arrangement may be of particular benefit where the two pairs of adjacent locks are arranged to be accessed from a face of the housing 100 which is closest to the surface of the Earth. This is because radial movement in the direction of this face is expected to be greater than on other faces due to the effects of gravity. Providing additional radial locks resisting movement in this direction therefore aids in counteracting the effects of gravity in producing additional radial movement.

In some embodiments, such as those shown in FIGS. 5 and 7, the housing 100 may be provided with a removable access cover 102 which, when removed, enables a user to access the plurality of radial locks 60. In alternative embodiments, the housing 100 may be provided with a plurality of access cavities (one for each of the radial locks 60) positioned such that the cavities enable access to the plurality of radial locks 60 from outside the housing 100. The provision of these cavities enables the generator 24 to be shifted between the radially locked and radially unlocked configurations without requiring any part of the housing 100 to be removed.

Returning now to the embodiment of FIGS. 5 to 8, there is shown an axial locking mechanism, used for restricting movement of the rotor 32 in an axial direction. Since locking the rotor 32 is to be done relative to some static reference frame, also an end shield 90 is defined. It is however noted that, in a fully assembled generator 24, the end shield 90 may just be a part of the generator housing 100 itself or a separate static part comprised therein and fixedly attached thereto. The end shield 90 is located axially outward and at least partially adjacent the end surface. It may comprise a central opening, through which parts to be serviced can be reached or removed. The axial locking mechanism comprises an axial lock 80. The axial lock 80 is shown at the non-drive end 64 of the rotor 32 in each of the Figures, where the non-drive end 64 is defined as the end which faces away from the wind turbine drive train (powertrain) when in use. At the non-drive end 64, the lock will be better accessible for locking and unlocking. However, in other powertrains one or more axial locks may be installed at the drive end 62. When not accessible by hand, the axial locks may be switched remotely, possibly with the help of an electrical or mechanical actuator. It is to be appreciated that whilst one axial lock 80 is shown in the Figures, in some embodiments, the rotor 32 may be provided with a plurality of axial locks 80.

The axial lock 80 comprises a block 82 and a rotor engagement tool 84 to which the block 82 is coupled. The rotor engagement tool 84 is configured to be able to engage with a lock engagement feature 86 of the rotor 32, where the lock engagement feature 86 is arranged at an end surface on an axial end of the rotor 32. In FIGS. 5 to 8, the lock engagement feature 86 is an axial end of a tie rod. The tie rod passes through, and is coupled to, each of a plurality of magnetic rings of the rotor 32 and rotates as the rotor 32 rotates. The tie rod is typically used to provide structural support to the rotor 32. The rotor 32 of this embodiment comprises a plurality of tie rods, each of which may be used as a lock engagement feature 86.

The engagement between the rotor engagement tool 84 and the lock engagement feature 86 may be enabled by any suitable coupling mechanism. For example, the axial end of the tie rod shown in FIGS. 5 to 8 may be threaded, and a portion of the rotor engagement tool 84 may comprise a cavity which is threaded in a manner which is complementary to the threading of the axial end of the tie rod. In this example, engagement between the rotor engagement tool 84 and the lock engagement feature 86 is enabled by screwing the two features together. Similarly disengagement is enabled by unscrewing the two features.

In other embodiments, the engagement between the rotor engagement tool 84 and the lock engagement feature 86 may be enabled by providing two complementary shaped mating portions on each of the rotor engagement tool 84 and the lock engagement feature 86, and are configured so that the rotor engagement tool may be turned to bring the two portions into a locked configuration. When the engagement is to be enabled, the two portions are brought into contact and the rotor engagement tool 84 is turned to lock the two portions together. When disengagement is required, the rotor engagement tool 84 is turned in the opposite direction to decouple the two portions.

The rotor 32 of FIGS. 5 to 8 comprises an end shield 90. The end shield 90 is arranged such that it extends axially outward from and partially adjacent to the end surface of the rotor 32 as described above. The end shield 90 is configured to house the rotor 32 and to remain stationary whilst the rotor 32 rotates.

The end shield 90 comprises at least one opening, and the opening enables access to the end surface of the rotor 32 from outside of the end shield 90, without requiring that the end shield 90 be removed. In some embodiments, when access to the end surface of the rotor 32 is not required, the opening may be covered with a removable cover. This may be provided to prevent dust or other detritus from entering the rotor 32 during operation. These covers may need to be removed when access to the end surface of the rotor 32 is required. The opening is configured such that it is large enough to allow the lock engagement feature 86 of the rotor engagement tool 84 to pass axially through the opening and so that the block 82 portion of the rotor engagement tool 84 may be placed securely against the end shield 90. In some embodiments, this will mean that the opening is configured to be smaller than the block 82 such that the block 82 cannot pass through the opening. In other embodiments, the end shield 90 and the block may be provided with complementary attachment means (such as being provided with magnetic portions configured to attract and attach to one another) in order to securely attach the block 82 to the end shield 90. The inclusion of the openings as described above enables the lock engagement feature 86 to be engaged by the axial lock 80 whilst simultaneously allowing the axial lock 80 to be placed against and affix to the end shield 90.

In some embodiments, the block portion 82 may comprise a plate which is configured to cover the opening of the end shield 90 when the rotor engagement tool 84 passes axially through the opening. This may be provided to prevent dust or other detritus from entering the rotor 32 when the axial lock 80 is engaged with the lock engagement feature 86 of the rotor 32. It is to be appreciated that any configuration of the block portion 82 may be used so long as the axial lock 80 is securely attached to the end shield 90 when in use.

In the embodiment of FIGS. 5 to 8, in order for the rotor 32 to be placed into an axially locked configuration, the rotor engagement tool 84 of the axial lock 80 is inserted axially through the opening of the end shield 90. The rotor engagement tool 84 then engages with the lock engagement feature 86 on the end surface of the rotor 32 in accordance with embodiments described above. Simultaneously, the block portion 82 of the axial lock 80 is secured against the end shield 90 in accordance with embodiments described above. Once the axial lock 80 is positioned as described, the rotor 32 is held in substantially the same relative axial position with respect to the end shield 90 and as a result, axial movement of the rotor 32 is resisted in both directions.

In order for the rotor 32 to be placed into an axially unlocked configuration, the rotor engagement tool 84 is arranged such that the rotor engagement tool 84 is disengaged from the lock engagement feature 86 and the block 82 and rotor engagement tool 84 are both removed from the opening of the end shield 90.

FIGS. 5 to 8 each show an axially locked configuration of the rotor 32 where the rotor engagement tool 84 is engaged with the lock engagement feature 86 of the rotor 32, and the block 82 is securely attached to the end shield 90 by way of a bolting mechanism. It is to be appreciated that the opening of the end shield 90 is not completely visible in FIGS. 5 to 8 since the axial lock 80 is shown extending through and entirely covering the opening. An axially unlocked configuration is not shown in the Figures, but it is to be understood that such a configuration uncovers the opening in the end shield 90 by the absence of the axial lock described above, with no engagement between the axial lock and the end shield 90 or the lock engagement feature 86.

In alternative embodiments, the axial lock 80 may be configured to be permanently attached to the end shield 90, with the rotor engagement tool 84 extending through the opening and the opening being covered by the block portion 82 of the axial lock 80. In these embodiments, the rotor engagement tool 84 may be configured to have both an engaged and withdrawn state. In the engaged state, the rotor engagement tool 84 is brought into engagement with the lock engagement feature 86 in accordance with embodiments described above. In the withdrawn state, the rotor engagement tool 84 no longer engages with the lock engagement feature 86 but continues to extend through the opening of the end shield 90. In the withdrawn state, the rotor engagement tool 84 is configured to be sufficiently withdrawn from the rotor 32 such that it does not impede the rotation of the rotor 32 in use.

In operation, the axial locking mechanism of the embodiment of FIGS. 5 to 8 is configured to be able to shift from an axially unlocked configuration to an axially locked configuration and vice versa when each configuration is required. Typically, the axial locking mechanism will be shifted to the axially locked configuration when access is required to inner components of the rotor 32. Such access may be needed when inner components of the rotor 32 require maintenance, and axially locking the rotor 32 enables a user to more readily access these components such that they can be removed or otherwise repaired without having to remove the complete rotor 32. When the rotor 32 is shifted between the unlocked configuration and the locked configuration, the rotor 32 has been slowed down to stationary. Additionally, the axial locking mechanism will also be shifted to the axially locked configuration when the generator 24 and/or gearbox are to be transported from one location to the other. Axially locking the rotor 32 during transportation can prevent damage to components of the generator 24 and/or gearbox which may otherwise be incurred if the rotor 32 was allowed to move freely in an axial direction.

The axial locking mechanism is configured to be attachable to the lock engagement feature 86 irrespective of the rotational position of the rotor 32, and therefore irrespective of the rotational position of the lock engagement feature 86. This may be achieved using any suitable arrangement of the opening, the axial lock 80 and the lock engagement feature 86. In the embodiment of FIGS. 5 to 8, the rotor 32 is provided with a plurality of tie rods equally extending axially throughout the length of the rotor 32, with each of the tie rods being located at substantially the same radial distance from the axis of rotation of the rotor 32. Each of the tie rods comprises a lock engagement feature 86 at the non-drive end 64 of the rotor 32. The end shield 90 of FIGS. 5 to 8 comprises a plurality of openings, each partially located at the same radial distance from the axis of rotation of the rotor 32 as the plurality of tie rods. It is to be appreciated that in some embodiments, the end shield 90 may comprise a single opening partially located at the same radial distance from the axis of rotation of the rotor 32 as the plurality of tie rods Returning to the embodiment of FIGS. 5 to 8, the plurality of openings are shaped in such a manner and spaced around the end shield 90 such that regardless of the rotational position of the rotor 32 when it is brought to a stop in order to shift between the axially unlocked and the axially locked configuration, it is possible to access at least one of the tie rods through the openings of the end shield 90. In some embodiments, this is achieved by providing one or more openings such that each opening at least covers an angular range greater than the angular separation between each consecutive lock engagement feature 86. This guarantees that regardless of the rotational position of the rotor 32, at least one lock engagement feature 86 is accessible through the opening. In the embodiment of FIGS. 5 to 8, there are provided a plurality of axial locks equal to the number of openings in the end shield 90, and shifting the rotor 32 to an axially locked configuration comprises affixing each of the axial locks to a separate tie rod through a separate opening of the end shield 90 in accordance with embodiments described above.

In some embodiments, the axial locking mechanism comprises four axial locks 80 in accordance with embodiments described above, and the end shield 90 is provided with four openings. Each of the four openings is positioned at substantially the same radial distance from the axis of rotation of the rotor 32. Furthermore, each of the openings is configured such that the centres of two consecutive openings are angularly separated with respect to the axis of rotation by 90°. It is to be appreciated that the shape of the openings and lock engagement features 86 are arranged such that each axial lock can be affixed to a lock engagement feature 86 through a separate opening of the end shield 90 irrespective of the rotational position of the rotor 32.

It is to be appreciated that in other embodiments, it is possible to provide a single opening and a single axial lock which is able to engage with a lock engagement feature 86 regardless of the rotational position of the rotor 32. This may comprise providing a single opening which allows access to a lock engagement feature 86 in all rotational positions.

In some embodiments, the at least one lock engagement feature 86 of the rotor 32 and the opening of the end shield (90) are each located radially outward from the inner components of the rotor 32 described above which are to be accessed such that they can be removed or otherwise repaired without having to remove the complete rotor 32. Such components may include the bearing cassette of the nacelle 4. Positioning the at least one lock engagement feature 86 of the rotor 32 and the opening in this way enables the inner components to be more easily accessed when they are to be removed or repaired.

Figure 9:
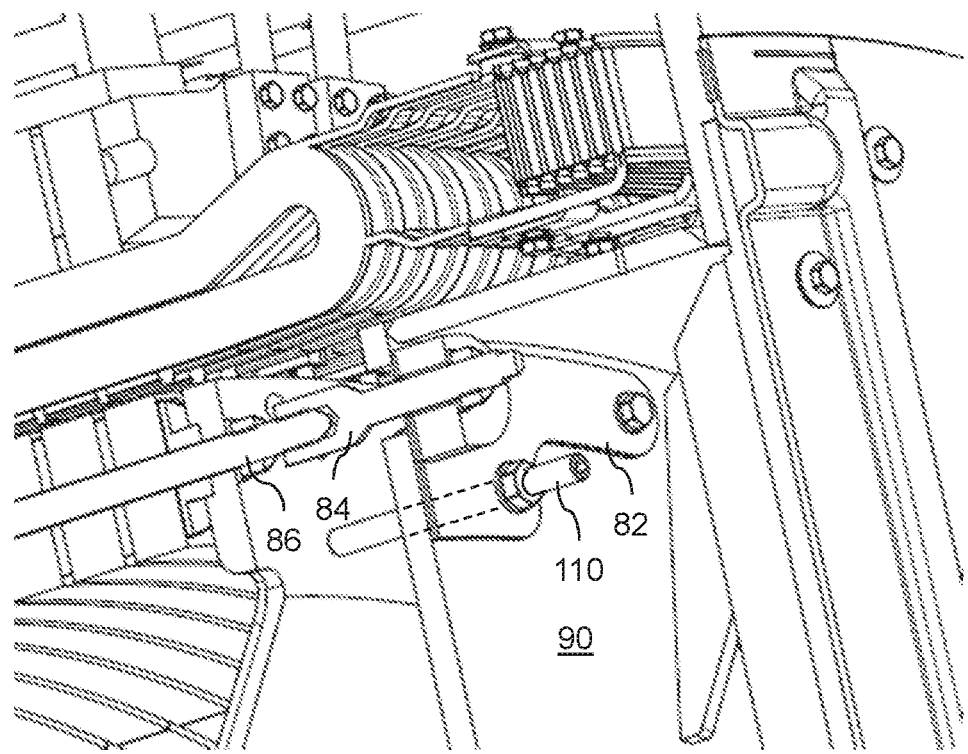
FIG. 9 is a cutaway isometric view of an embodiment of the generator of FIG. 2 in an axially locked configuration.

In some embodiments, the axial lock 80 is additionally provided with one or more push pins 110, as illustrated in FIG. 9. The push pin 110 is configured to move relative to the end shield 90 and axially with respect to the axis of the rotation of the rotor 32, wherein, in the axially locked configuration of the rotor 32, the push pin 110 contacts the end surface of the rotor 32 and is coupled to the axial lock such as to further resist axial movement of the rotor 32. In this embodiment, the push pin 110 is configured to move through the opening of the end shield 90. The provision of a push pin 110 may provide additional resistance to axial movement of the rotor 32 and in particular, may provide resistance to axial movement in a direction in a vector opposite direction to that of the rotor engagement tool 84. In so doing, the provision of both a push pin 110 and a rotor engagement tool 84 may ensure full axial locking of the rotor 32 in both vector axial directions. In the embodiment shown in FIG. 9, the rotor engagement tool 84 engages with the lock engagement feature 86 of the rotor 32 and effectively "pulls" the rotor 32 toward the end shield 90, and resists the axial movement of the rotor 32 away from the end shield 90. Simultaneously, the push pin 110 is brought into contact with the end surface of the rotor 32 and effectively "pushes" the rotor 32 axially away from the end shield 90, and resists axial movement of the rotor 32 toward the end shield 90. The combination of the two axial resistances described above effectively locks the rotor in a single axial position.

In some embodiments, the push pin 110 comprises a threaded bolt that engages with a threaded bore in the end shield 90. The threaded bolt may be screwed through the end shield 90 in order to bring it into contact with an axially exterior surface of the rotor 32. The threading then acts so as to couple the threaded bolt to the end shield 90 and resists movement of the rotor 32 in an axial direction. The push pin 110 may be engaged and disengaged with the exterior surface of the rotor 32 using a screwdriver, a torque wrench or any other suitable hand held tool. Alternatively, an end of the push pin 110 comprises a grip for engaging and disengaging the push pin 110 by hand. In some embodiments where the axial lock 80 is securely attached to the end shield 90 by way of a bolting mechanism (either permanently or temporarily), the bolts used to secure the axial lock 80 to the end shield 90 may also be used as the push pin 110. In embodiments where the axial lock 80 is permanently affixed to the end shield 90, the threaded bolts may be partially screwed through the end shield 90 in order to secure the axial lock 80 to the end shield 90 and may be further screwed in order to bring the bolt into contact with the rotor 32 (i.e. may be brought into an axially locked configuration in accordance with embodiments described above). Where the bolt does not contact the rotor 32, the axial lock 80 of this embodiment is in the axially unlocked configuration. In such a configuration, the bolt is configured to be positioned in such a manner that the rotation of the rotor 32 is not impeded.

In the embodiment of FIGS. 5 to 8, the generator 24 is provided both with a radial and an axial locking mechanism. In such an embodiment, the generator 24 is further provided with a locked and an unlocked configuration. In the locked configuration, the generator 24 is configured to be in both the radially and axially locked configurations. In the unlocked configuration, the generator 24 is configured to be in the radially and/or axially unlocked configurations. In operation, the radial and axial locking mechanisms of the present invention are configured to be shifted from an unlocked configuration to a locked configuration and vice versa when each configuration is required.

Many modifications may be made to the specific examples described above without departing from the scope of the invention as defined in the accompanying claims. Features of one embodiment may also be used in other embodiments, either as an addition to such embodiment or as a replacement thereof.

The invention claimed is:

1. A generator for a wind turbine, the generator comprising a rotor assembly, a stator and a radial locking mechanism, the rotor assembly comprising:
    a rotor with an axis of rotation and an end surface located on an axial end of the rotor, the rotor comprising at least one lock engagement feature arranged at the end surface;
    an end shield located axially outward and at least partially adjacent the end surface, the end shield comprising at least one opening enabling access to the end surface of the rotor; and
    an axial locking mechanism comprising at least one axial lock comprising a removable block configured to partly cover the at least one opening of the end shield and a rotor engagement tool for engaging the removable block with the at least one lock engagement feature;
    the axial locking mechanism being arranged to shift the rotor assembly between an axially locked and an axially unlocked configuration, wherein:
    in the axially locked configuration the removable block of the at least one axial lock is placed against the end shield, thereby at least partly covering the at least one opening, while the rotor engagement tool engages the removable block with the at least one lock engagement feature, such that the axial lock resists axial movement of the rotor; and
    in the axially unlocked configuration, the removable block and the rotor engagement tool are removed from the opening of the end shield such that the rotor is movable in at least one axial direction; and
    wherein the radial locking mechanism comprises a plurality of radial locks and wherein the radial locks comprise:
    a fixed portion coupled to the stator; and
    a movable elongate portion configured to move relative to the fixed portion and radially with respect to the axis of the rotation;
    the radial locks being arranged to shift the generator between a radially locked and a radially unlocked configuration, wherein in the radially locked configuration, the movable elongate portions of the radial locks contact an exterior surface of the rotor and are coupled to their respective fixed portions such that the movable elongate portions resist radial movement of the rotor; and
    in the radially unlocked configuration, the movable elongate portion of at least one of the radial locks does not contact the exterior surface of the rotor such that the rotor is movable in at least one radial direction.

2. The generator of claim 1, the generator further configured to shift between a locked and an unlocked configuration, wherein
    in the locked configuration, the generator is in the radially locked configuration and in the axially locked configuration; and
    in the unlocked configuration, the generator is in the radially unlocked configuration and/or in the axially unlocked configuration.

3. A generator for a wind turbine, the generator comprising a rotor with an axis of rotation, a stator and a radial locking mechanism, wherein the radial locking mechanism comprises a plurality of radial locks and wherein the radial locks comprise:
    a fixed portion coupled to the stator; and
    a movable elongate portion configured to move relative to the fixed portion and radially with respect to the axis of the rotation;
    the radial locks being arranged to shift the generator between a radially locked and a radially unlocked configuration, wherein in the radially locked configuration, the movable elongate portions of the radial locks contact an exterior surface of the rotor and are coupled to their respective fixed portions such that the movable elongate portions resist radial movement of the rotor; and
    in the radially unlocked configuration, the movable elongate portion of at least one of the radial locks does not contact the exterior surface of the rotor such that the rotor is movable in at least one radial direction.

4. The generator of claim 3, wherein the plurality of radial locks are positioned such that at least when the generator is in the radially locked configuration, the movable elongate portions of the radial locks extend between two adjacent windings of the stator.

5. The generator of claim 4, wherein, at least when the generator is in the radially locked configuration, the movable elongate portions of the radial locks extend between two adjacent windings of the stator without contacting either of the two adjacent windings of the stator.

6. The generator of claim 1, wherein the plurality of radial locks are arranged in opposite pairs, and where the radial locks of one of the opposite pairs are located in substantially equal axial positions and substantially diametrically opposite one another with respect to the axis of the rotation of the rotor.

7. The generator of claim 1, wherein at least one of the plurality of radial locks is located at a drive end of the rotor and at least one of the plurality of radial locks is located at the non-drive end of the rotor, the non-drive end facing away from the wind turbine powertrain when in use.

8. The generator of claim 1, wherein a housing of the generator is substantially cuboid shaped, and wherein the plurality of radial locks is arranged such that access to the radial locks is enabled via at least one face of the housing extending along the axial direction for shifting the respective radial lock between the radially locked and the radially unlocked configuration.

9. The generator of claim 8, wherein the housing is provided with a plurality of lock access cavities, the lock access cavities being positioned to enable access to the elongate portions of the respective radial locks from outside the housing.

10. The generator of claim 8, wherein the plurality of radial locks is arranged in pairs of adjacent radial locks in substantially equal axial positions and where both adjacent radial locks in the pair of adjacent radial locks are accessible from the same face of the housing.

11. The generator of claim 10, wherein two adjacent pairs of adjacent radial locks are arranged such that both adjacent pairs of adjacent radial locks are accessible from the same face of the cuboid housing.

12. A generator for a wind turbine, the generator comprising a rotor assembly, the rotor assembly comprising:
 a rotor with an axis of rotation and an end surface located on an axial end of the rotor, the rotor comprising at least one lock engagement feature arranged at the end surface;
 an end shield located axially outward and at least partially adjacent the end surface, the end shield comprising at least one opening enabling access to the end surface of the rotor; and
 an axial locking mechanism comprising at least one axial lock comprising a removable block configured to partly cover the at least one opening of the end shield and a rotor engagement tool for engaging the removable block with the at least one lock engagement feature;
 the axial locking mechanism being arranged to shift the rotor assembly between an axially locked and an axially unlocked configuration, wherein:
 in the axially locked configuration the removable block of the at least one axial lock is placed against the end shield, thereby at least partly covering the at least one opening, while the rotor engagement tool engages the removable block with the at least one lock engagement feature, such that the axial lock resists axial movement of the rotor; and
 in the axially unlocked configuration, the removable block and the rotor engagement tool are removed from the opening of the end shield such that the rotor is movable in at least one axial direction.

13. The generator of claim 12, wherein the opening enabling access to the rotor is located at the non-drive end of the rotor assembly, the non-drive end facing away from the wind turbine powertrain when in use.

14. The generator of claim 12, wherein the rotor comprises a plurality of the lock engagement features.

15. The generator of claim 12, wherein the end shield comprises a plurality of the openings enabling access to the end surface of the rotor.

16. The generator of claim 12, wherein the rotor comprises a plurality of the lock engagement features, the end shield comprises a plurality of the openings enabling access to the end surface of the rotor, and the axial locking mechanism comprises a plurality of the axial locks, and wherein
 in the axially locked configuration, the removable block of each axial lock is placed against the end shield, thereby at least partly covering a respective one of the plurality of openings, while the respective rotor engagement tool engages the removable block with a respective one of the plurality of lock engagement features, such that the axial lock resists axial movement of the rotor.

17. The generator of claim 16, wherein the plurality of lock engagement features and the plurality of openings are located radially outward from one or more internal components of the rotor assembly, such that the internal components are accessible from an exterior of the rotor assembly when the rotor assembly is in its axially locked configuration.

18. The generator of claim 16, wherein the plurality of lock engagement features and the plurality of openings are located radially outward from a point of connection to a bearing cassette in a gearbox which, in use, is operatively coupled to the rotor assembly, such that the bearing cassette is accessible from an exterior of the rotor assembly when the rotor assembly is in its axially locked configuration.

19. The generator of claim 16, wherein the end shield comprises four openings and wherein centres of two consecutive openings are separated angularly with respect to the axis of the rotation by an angle of 90°.

20. The generator of claim 12, wherein the at least one lock engagement feature comprises a threaded tie rod end and where, in the axially locked configuration, the rotor engagement tool of the axial lock is screw fitted to the tie rod end.

21. The generator of claim 12, wherein the axial lock further comprises a push pin configured to move relative to the end shield and axially with respect to the axis of the rotation of the rotor, wherein, in the axially locked configuration of the rotor assembly, the push pin is configured to contact the end surface of the rotor and is coupled to the axial lock such as to resist axial movement of the rotor in the direction of the end shield.

22. A wind turbine comprising a generator according to claim 1.

23. A method of removing or servicing one or more powertrain components from a powertrain of a wind turbine, the powertrain comprising a generator according to claim 1, the method comprising:
 engaging the radial locking mechanism;
 engaging the axial locking mechanism; and
 removing or servicing the one or more powertrain components through a central opening in the end shield.

24. The method of removing or servicing one or more powertrain components as claimed in claim 23, wherein the one or more powertrain components comprises one or more internal components of the rotor assembly.

25. The method of removing or servicing one or more powertrain components as claimed in claim 24, wherein the one or more powertrain components comprises a bearing cassette of a gearbox which, in use, is operatively coupled to the rotor assembly.

26. The method of removing or servicing one or more powertrain components as claimed in claim 23, wherein the one or more powertrain components comprises a stray current protection module.

27. A generator for a wind turbine, the generator comprising a rotor with an axis of rotation, a stator and a radial locking mechanism, wherein the radial locking mechanism comprises a plurality of radial locks and wherein the radial locks comprise:
 a fixed portion coupled to the stator; and a movable elongate portion positioned between axial ends of the rotor and configured to move relative to the fixed portion and radially with respect to the axis of the rotation;

the radial locks being arranged to shift the generator between a radially locked and a radially unlocked configuration, wherein in the radially locked configuration, the movable elongate portions of the radial locks contact an exterior surface of the rotor and are coupled to their respective fixed portions such that the movable elongate portions resist radial movement of the rotor; and in the radially unlocked configuration, the movable elongate portion of at least one of the radial locks does not contact the exterior surface of the rotor such that the rotor is movable in at least one radial direction.

* * * * *

UNITED STATES PATENT AND TRADEMARK OFFICE
CERTIFICATE OF CORRECTION

| | | |
|---|---|---|
| PATENT NO. | : 12,092,084 B2 | Page 1 of 1 |
| APPLICATION NO. | : 17/420728 | |
| DATED | : September 17, 2024 | |
| INVENTOR(S) | : Henrik Zaar Mannik et al. | |

It is certified that error appears in the above-identified patent and that said Letters Patent is hereby corrected as shown below:

In the Claims

Claim 25, Column 20, Line 54, change "as claimed in claim 24" to -- as claimed in claim 23 --.

Signed and Sealed this
Third Day of December, 2024

Katherine Kelly Vidal
*Director of the United States Patent and Trademark Office*